(12) United States Patent
Fukuda

(10) Patent No.: US 6,275,550 B1
(45) Date of Patent: Aug. 14, 2001

(54) DATA TRANSMISSION DEVICE

(75) Inventor: Kazuhisa Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/275,264

(22) Filed: Mar. 23, 1999

(30) Foreign Application Priority Data

Mar. 23, 1998 (JP) .................................................. 10-074749

(51) Int. Cl.⁷ .................................................... H04L 7/00
(52) U.S. Cl. ........................ 375/357; 357/373; 370/505; 370/517; 327/161
(58) Field of Search .................................. 375/354, 357, 375/373; 370/503, 505, 517; 327/141, 161

(56) References Cited

U.S. PATENT DOCUMENTS

| | | | |
|---|---|---|---|
| 5,867,541 | * 2/1999 | Tanaka et al. | 375/354 |
| 5,987,083 | * 11/1999 | Matsushita et al. | 375/356 |
| 6,069,927 | * 5/2000 | Kikuchi | 375/357 |

FOREIGN PATENT DOCUMENTS

| | | |
|---|---|---|
| 61-7756 | 1/1986 | (JP) . |
| 2-1943 | 1/1990 | (JP) . |
| 5-276087 | 10/1993 | (JP) . |
| 7-123120 | 5/1995 | (JP) . |
| 8-223236 | 8/1996 | (JP) . |
| 8-274826 | 10/1996 | (JP) . |

* cited by examiner

*Primary Examiner*—Amanda T. Le
(74) *Attorney, Agent, or Firm*—Foley & Lardner

(57) ABSTRACT

A phase detecting/collating circuit collates a phase of a reception serial data input from outside through an external interface circuit, a phase of the reception data shift clock output from the clock frequency divider/corrector circuit, and a phase of a phase collating clock obtained by delaying the reception data shift clock by ¼ periodic cycle of the reception data shift clock by means of the delay circuit. By the phase collation in the phase detecting/collating circuit, if a difference in phase capable of generating a reception error in the data transmission circuit is detected, the clock shortening timing signal or the clock elongating timing signal is output. A reception clock frequency divider/corrector circuit corrects such as to shorten or elongate said reception data shift clock when a clock shortening timing signal or a clock elongating timing signal is input, respectively. With this effect, the reception operation in the data transmission circuit is executed always normally.

5 Claims, 13 Drawing Sheets

DATA TRANSMISSION DEVICE

BACKGROUND OF THE INVENTION

1. Field of the Invention

The present invention relates to a data transmission device capable of carrying out clock correction independent from transfer rate, and realizing both normal data reception and speed-up of the data transmission.

2. Description of the Related Art

FIG. 1 is a block diagram showing a configuration of a conventional data transmission device described in Japanese Patent Application Laid-open No.S61-7756. In the following description, N represents an integer showing a divided frequency ratio of a clock and n represents an integer showing the upper limit of the divided frequency ratio determined by a system configuration of the data transmission device.

The conventional data transmission device comprises a data transmission circuit 101, an external interface circuit 102, a transmission clock frequency divider circuit 103, a reception clock frequency divider circuit 104, and a data transition detection circuit 105. The data transmission circuit 101 includes a function for receiving data input to a reception serial data 302 by a reception data shift clock 306, and a function for transmitting data to a reception serial data 301 by a reception data shift clock 304. The data transmission circuit 101 outputs a divided frequency ratio selection signal 309 (N=1 to n) based on transfer rate (½ of a basic clock 303) previously determined between this data transmission device and a target of the transmission external to the data transmission device. The external interface circuit 102 includes an interface function with external to the data transmission device. The transmission clock frequency divider circuit 103 and the reception clock frequency divider circuit 104 divide the basic clock 303 based on the divided frequency selection signal 309 which is input, and outputs the transmission data shift clock 304 and the reception data shift clock 306. The transmission data shift clock 304 is input to a terminal of the data transmission circuit 101. The reception data shift clock 306 is input to a terminal of the data transmission circuit 101.

As shown in FIG. 2, the reception clock frequency divider circuit 104 includes an AND gate 529 for controlling the input of the basic clock 303, an n-stage connection T-type flip-flop 517 for dividing the basic clock 303, an n-input selector 519 for selecting the reception data shift clock output from the reception clock frequency divider circuit 104, and a reception bit number counter 528 for counting the reception clock number. The n-stage connection T-type flip-flop 517 is arranged to be initialized if the reception clock frequency divider circuit initializing signal 310 is input to an initializing terminal RD. The data transition detection circuit 105 includes a function for outputting the reception clock frequency divider circuit initializing signal 310 if the data transition in the reception serial data 302 is detected.

Next, the operation of the conventional data transmission device will be explained with reference to a timing chart in FIG. 3. FIG. 3 shows the operation timing at the time of reception when the reception data shift clock 306 is set to be ⅛ of the basic clock 303. At the time of reception, there are two kinds of operation states. When there is no variation in the reception serial data 302, the reception clock frequency divider circuit 104 simply divides the basic clock 303 and supplies the reception data shift clock 306 to the data transmission circuit 101, whereby the data transmission circuit 101 latches the reception serial data 302 in synchronous with the rising edge of the reception data shift clock 306.

When there is a variation in the reception serial data 302, the data transition detection circuit 105 detects the data transition, and outputs the reception clock frequency divider circuit initializing signal 310. The reception clock frequency divider circuit 104 receives the reception clock frequency divider circuit initializing signal 310 and once initializes the division of the clock. Thereafter, if the reception clock frequency divider circuit initializing signal 310 falls, the reception clock frequency divider circuit 104 again starts the division of the clock and again supplies the reception data shift clock 306 to the data transmission circuit 101, whereby the data transmission circuit 101 again starts the latching of the reception serial data in synchronous with the rising edge of the reception data shift clock 306. The latch timing of the data transmission circuit 101 when there is a variation in the reception serial data 302 is always corrected to an intermediate value of the bit length of the reception serial data 302.

FIG. 4 shows the operation timing at the time of reception when the reception data shift clock 306 is set to ½ of the basic clock 303. At the time of the setting, if the initialization is carried out due to the reception clock frequency divider circuit initializing signal 310 when the length of the pulse width of the reception clock frequency divider circuit initializing signal 310 is ½ period of the basic clock 303 and in a section where the reception data shift clock 306 is of logic level "1", the counting operation is adversely started again immediately on the rising edge of the basic clock 303 immediately after the n-stage connection T-type flip-flop 517 is initialized, and there is a possibility that the reception data shift clock 306 is not divided. That is, the clock correction to shorten the clock is erroneously generated and there is a possibility that a normal receiving operation can not be carried out in the data transmission circuit 101.

To avoid such a problem, if the pulse width o the reception clock frequency divider circuit initializing signal 310 is elongated to the length of one cyclic period of the basic clock 303, there is an adverse possibility that the rising edge timing of the ½ clock is not varied even if the initialization is carried out due to the reception clock frequency divider circuit initializing signal 310. That is, there is a timing in which the clock is not corrected, and there is a possibility that a normal receiving operation can not be carried out in the data transmission circuit 101.

Further, if the pulse width o the reception clock frequency divider circuit initializing signal 310 is elongated to the length of one cyclic period of the basic clock 303, the stopping period of the n-stage connection T-type flip-flop 517 at the time of initialization due to the reception clock frequency divider circuit initializing signal 310 becomes too long, the clock correction to elongate the clock is erroneously generated, the latching timing of the reception data is lost, and there is a possibility that a normal receiving operation can not be carried out in the data transmission circuit 101.

These problems are caused by the following reasons. That is, according to the configuration of the conventional data transmission device, since the correction of the reception data shift clock is carried out by the initialization of the divider, when the dividing ratio of the reception data shift clock with respect to the basic clock is low, the initializing operation is not carried out depending upon the timing of the dividing operation and the initializing operation, or the initializing operation is generated at an erroneous timing with respect to the reception data, the clock correction operation is not effectively carried out, and a normal receiving operation an not be carried out.

More particularly, in the conventional data transmission device, as described above, when the reception data shift clock supplied to the data transmission circuit is ½ of the basic clock, the initialization of the reception data shift clock frequency divider is not normally carried out, or the clock shortening operation or the clock elongating operation is generated, the reception data shift clock is supplied to the data transmission circuit at an erroneous timing with respect to the reception data, and there is a possibility that the normal receiving operation of the reception serial data is not carried out, and the speed-up of the data transmission is not possible.

SUMMARY OF THE INVENTION

It is an object of the present invention to provide a data transmission device capable of realizing both normal data reception and speed-up of the transmission rate by carrying out clock correction independent from transfer rate.

In a data transmission device according to the present invention, an external interface circuit outputs, to the data transmission device, data which is input from external to the data transmission device as reception data, and outputs transmission data which is input from the data transmission device to external to the data transmission device. A transmission circuit outputs the input transmission data in synchronous with a shift clock, and stores the input reception data in synchronous with the shift clock. A delay circuit delays input reception shift clock, and outputs the same as a phase collating clock. A phase detecting/collating circuit determines a transition expecting section of the reception data based on a logic level of the input reception data shift clock and the phase collating clock to collate a phase of the reception data shift clock and a transition point of the input reception data. The phase detecting/collating circuit detects that it is necessary to shorten the reception data shift clock and outputs a clock shortening timing signal when the reception data transition point is earlier than the phase of the reception data shift clock. And the phase detecting/collating circuit detects that it is necessary to elongate the reception data shift clock and outputs a clock elongating timing signal when the reception data transition point is slower than the phase of the reception data shift clock. A reception clock frequency divider/corrector circuit divides a basic clock input from external to the data transmission device to output the reception data shift clock. The reception clock frequency divider/corrector circuit corrects such as to shorten the reception data shift clock and outputs the same when a clock shortening timing signal is input. And the reception clock frequency divider/corrector circuit corrects such as to elongate the reception data shift clock and outputs the same when a clock elongating timing signal is input. A transmission clock frequency divider circuit divides the basic clock which is input to the data transmission device and outputs a transmission data shift clock. Thereby, a clock is corrected independently from data transmission rata.

In the present invention, the reception data shift clock and the phase collating clock which is obtained by delaying the reception data shift clock are input to the reception data transition detection circuit. There is provided a circuit for collating the data transition expecting section and the reception data transition point determined by these two clocks. And the reception clock frequency divider circuit is provided with a circuit for correcting the reception data shift clock based on a signal indicating of the collation result of the phase. With this feature, a clock is corrected independently from data transmission rata, and both normal data correction and speed-up of the data transmission can be realized.

DESCRIPTION OF THE PREFERRED EMBODIMENT

Figure 1:
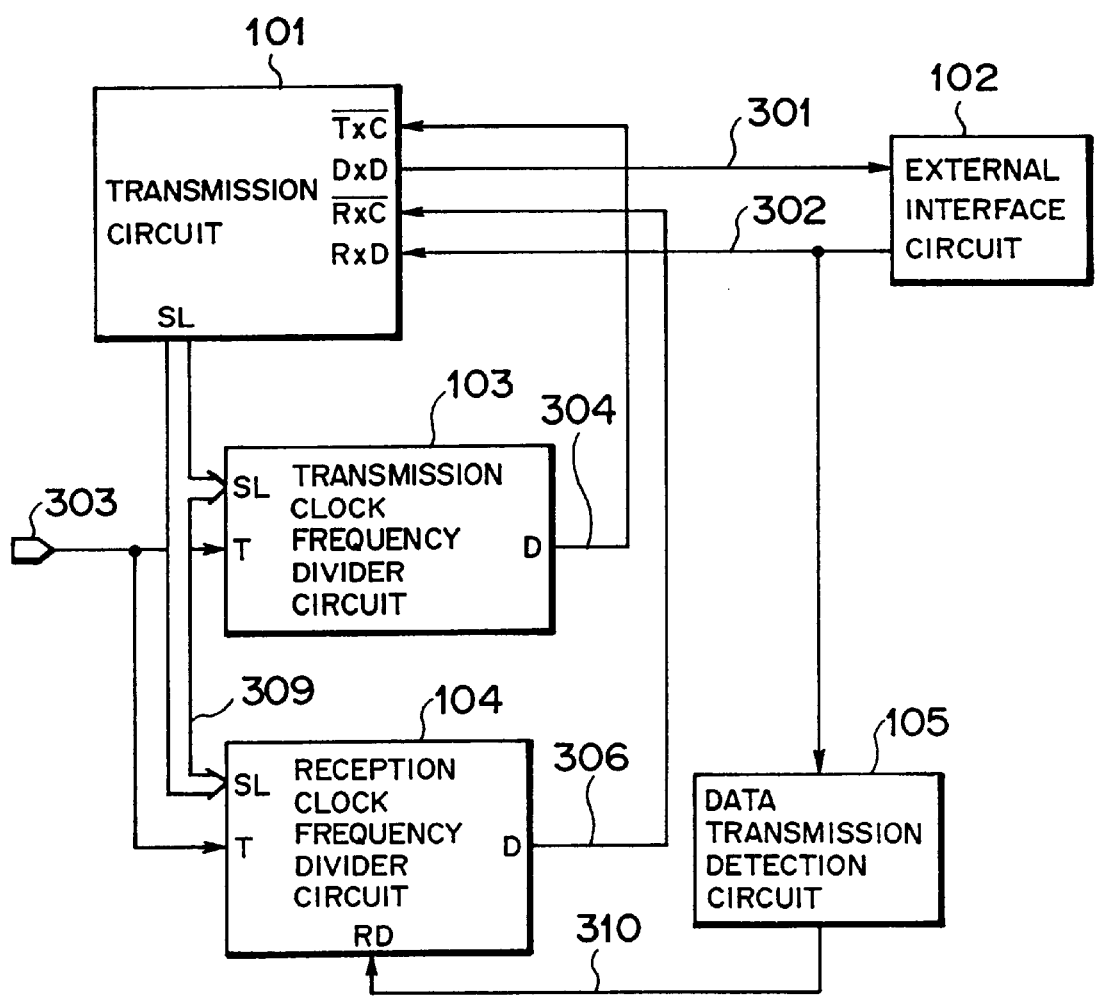
FIG. 1 is a block diagram showing a conventional data transmission device.
Figure 2:
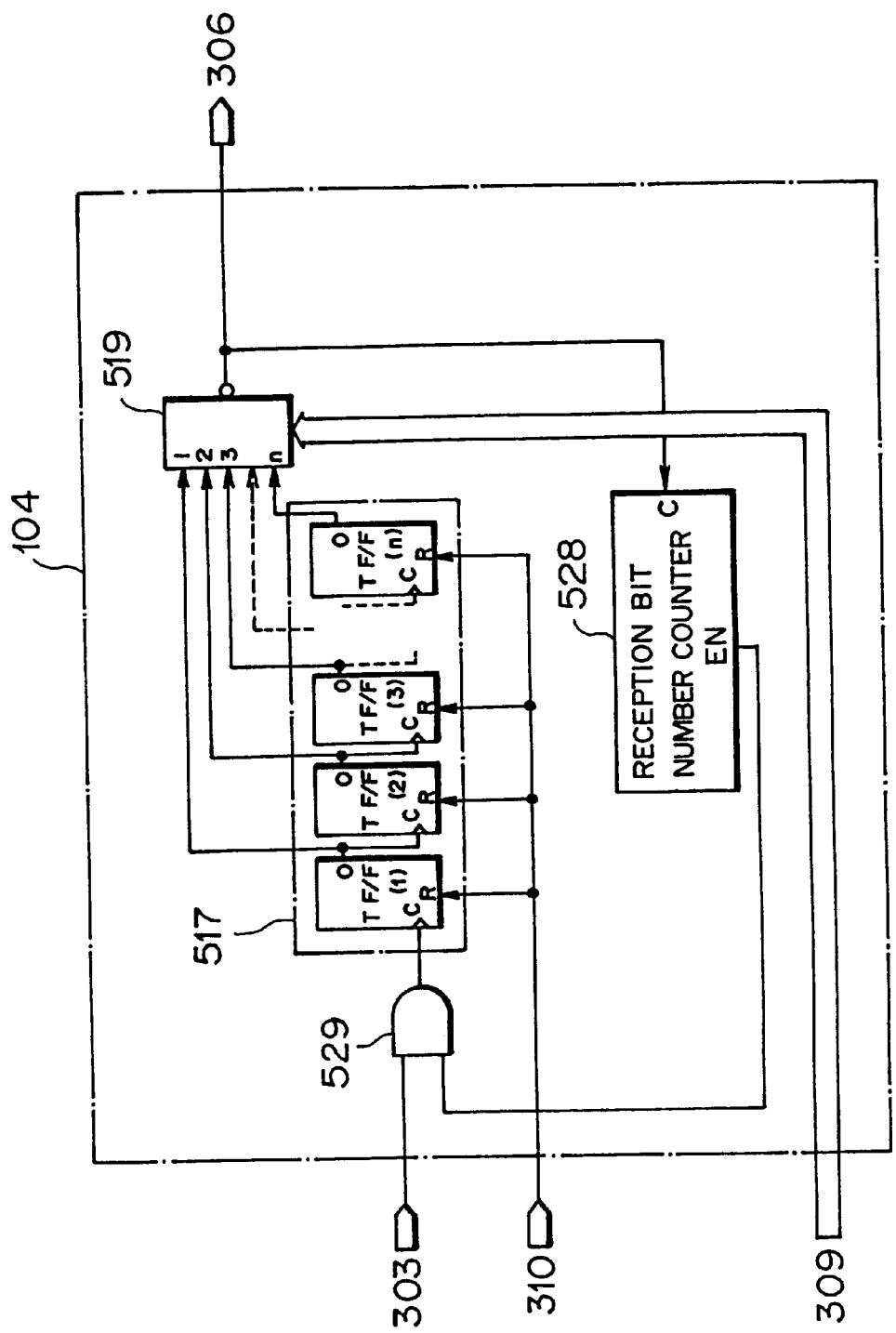
FIG. 2 is a schematic circuit diagram showing details of a reception clock frequency divider circuit 104 used in the conventional data transmission device.
Figure 3:
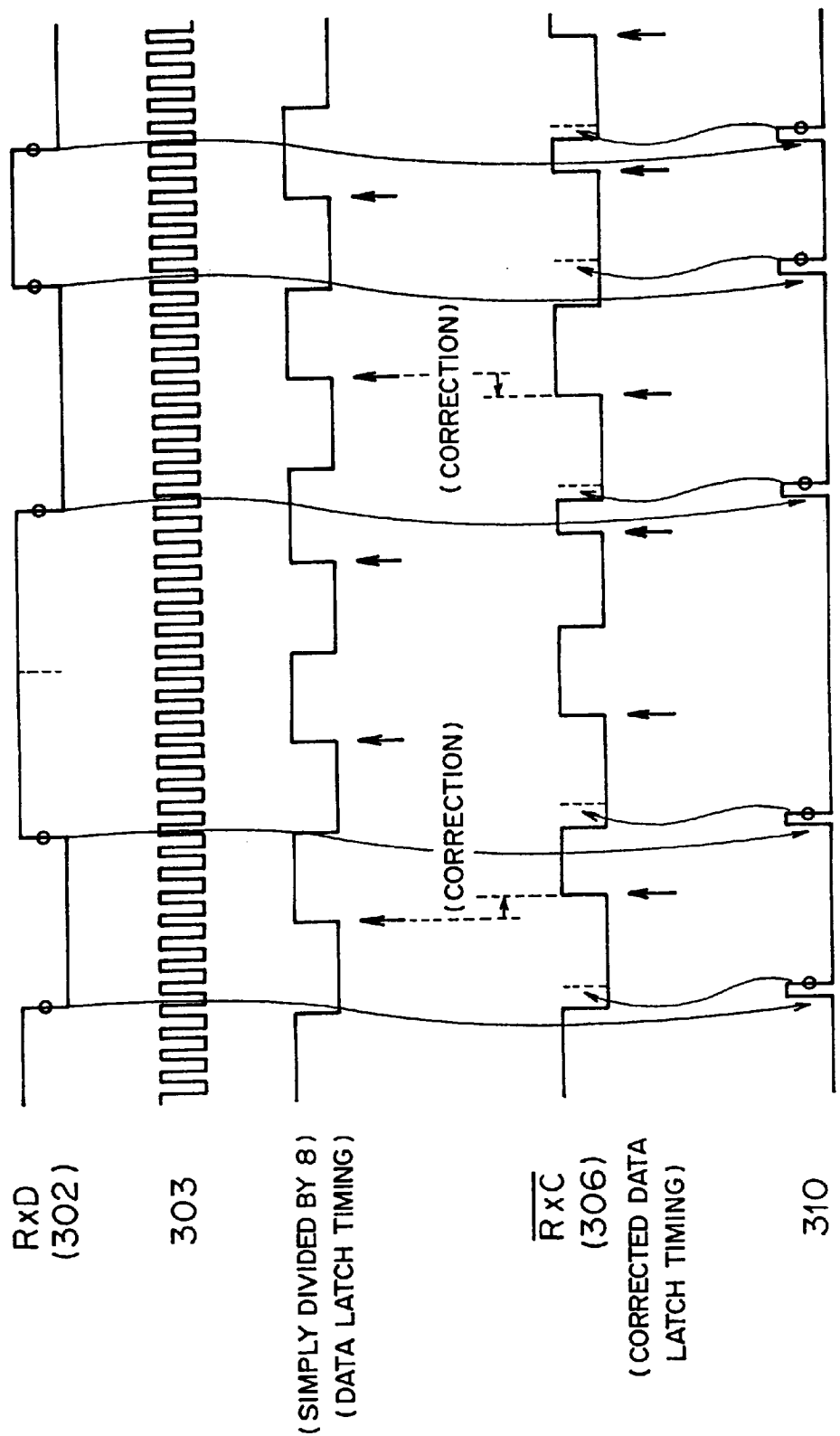
FIG. 3 is a timing chart of the conventional data transmission device.
Figure 4:
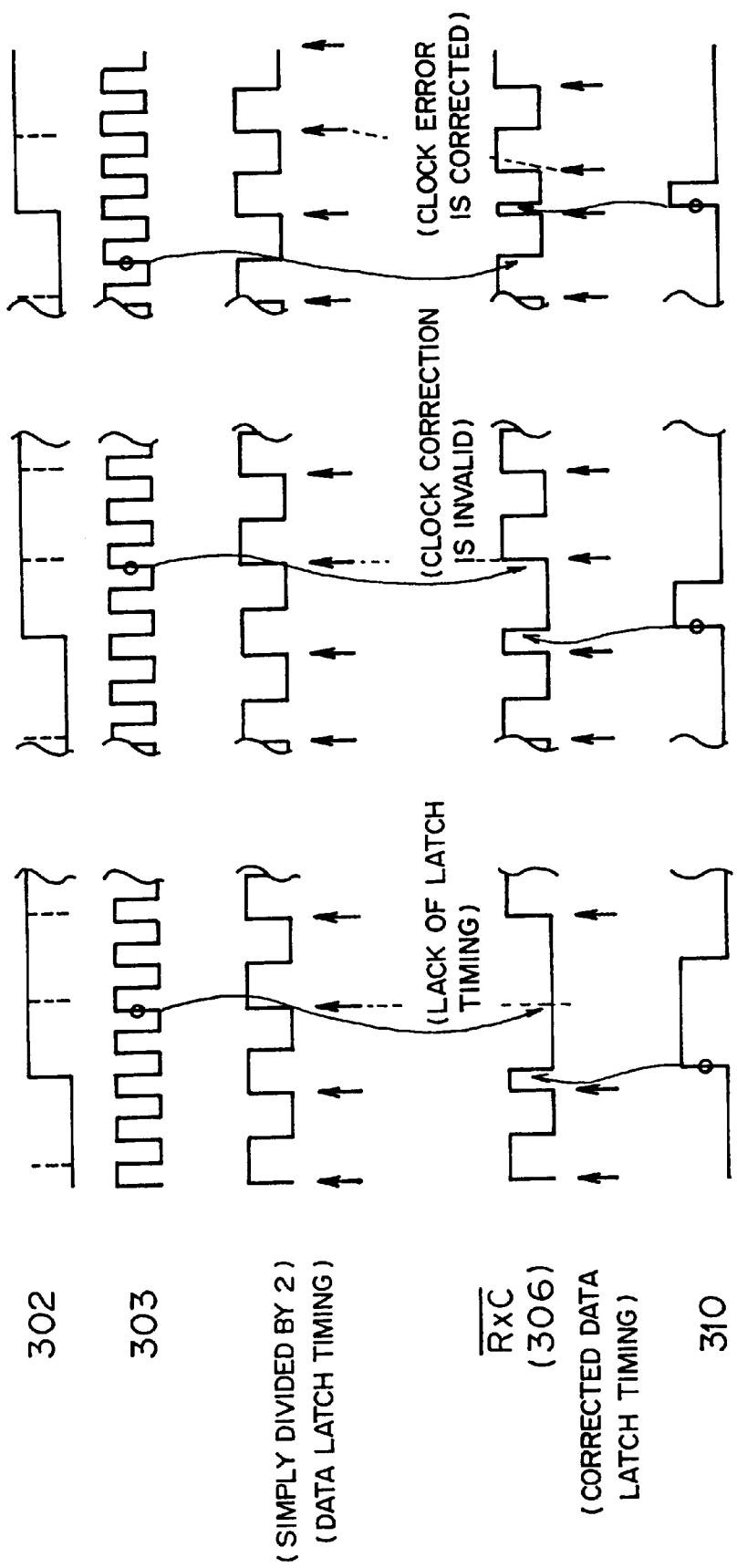
FIG. 4 is a timing chart of the conventional data transmission device.
Figure 5:
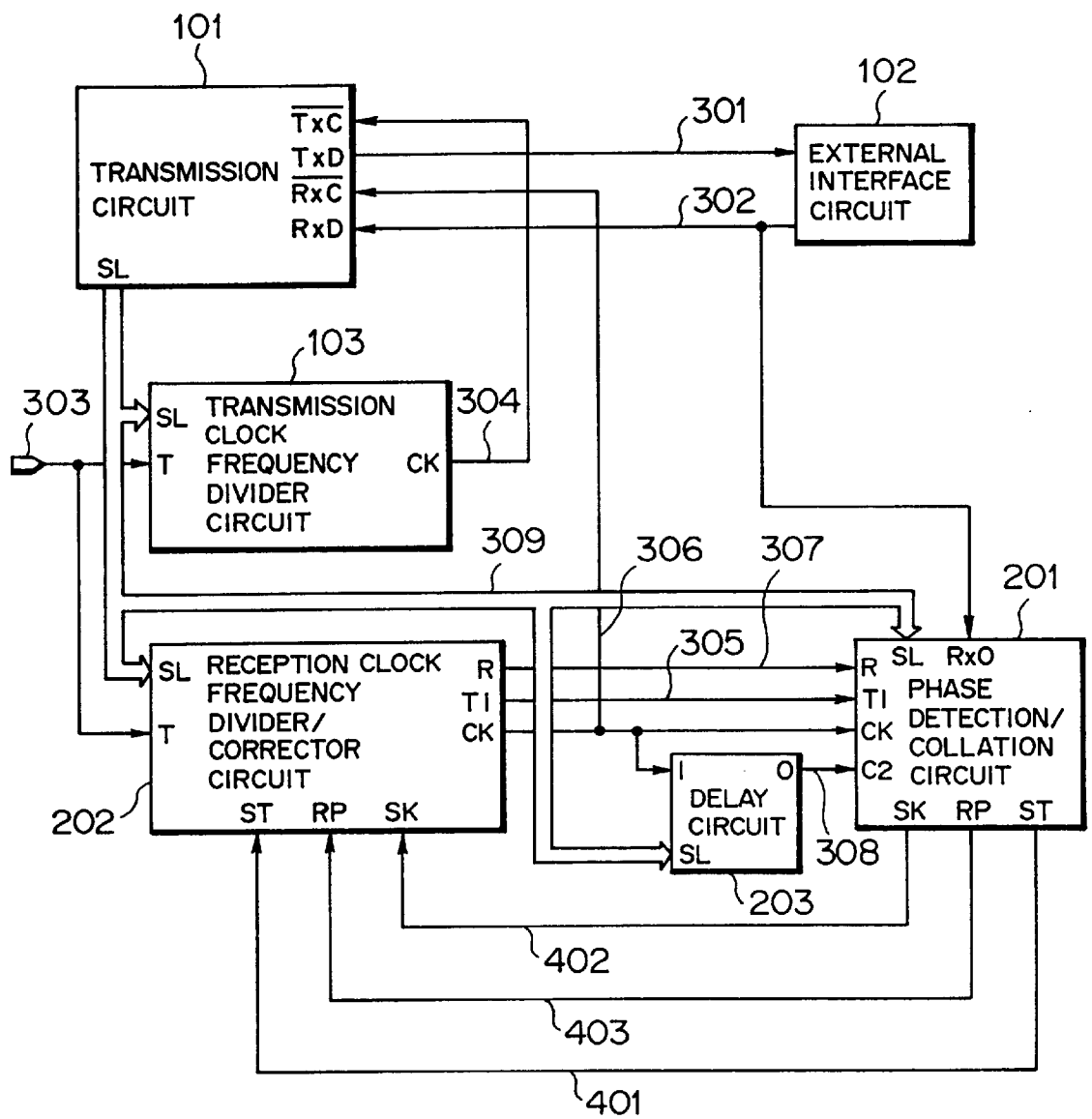
FIG. 5 is a block diagram showing a data transmission device according to a first embodiment of the present invention.
Figure 6:
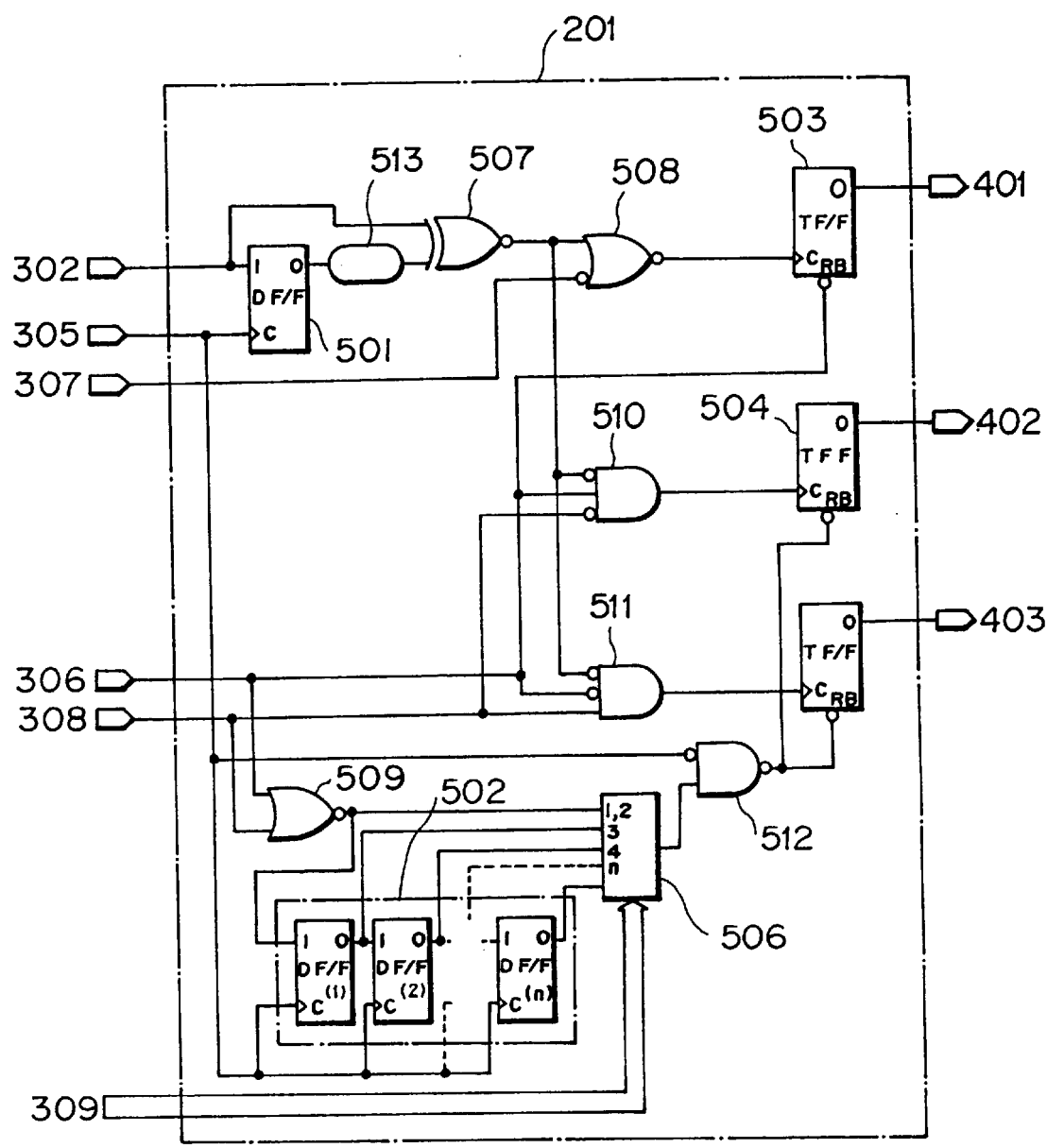
FIG. 6 is a schematic circuit diagram showing details of a phase detecting/collating circuit 201 used in the first embodiment.
Figure 7:
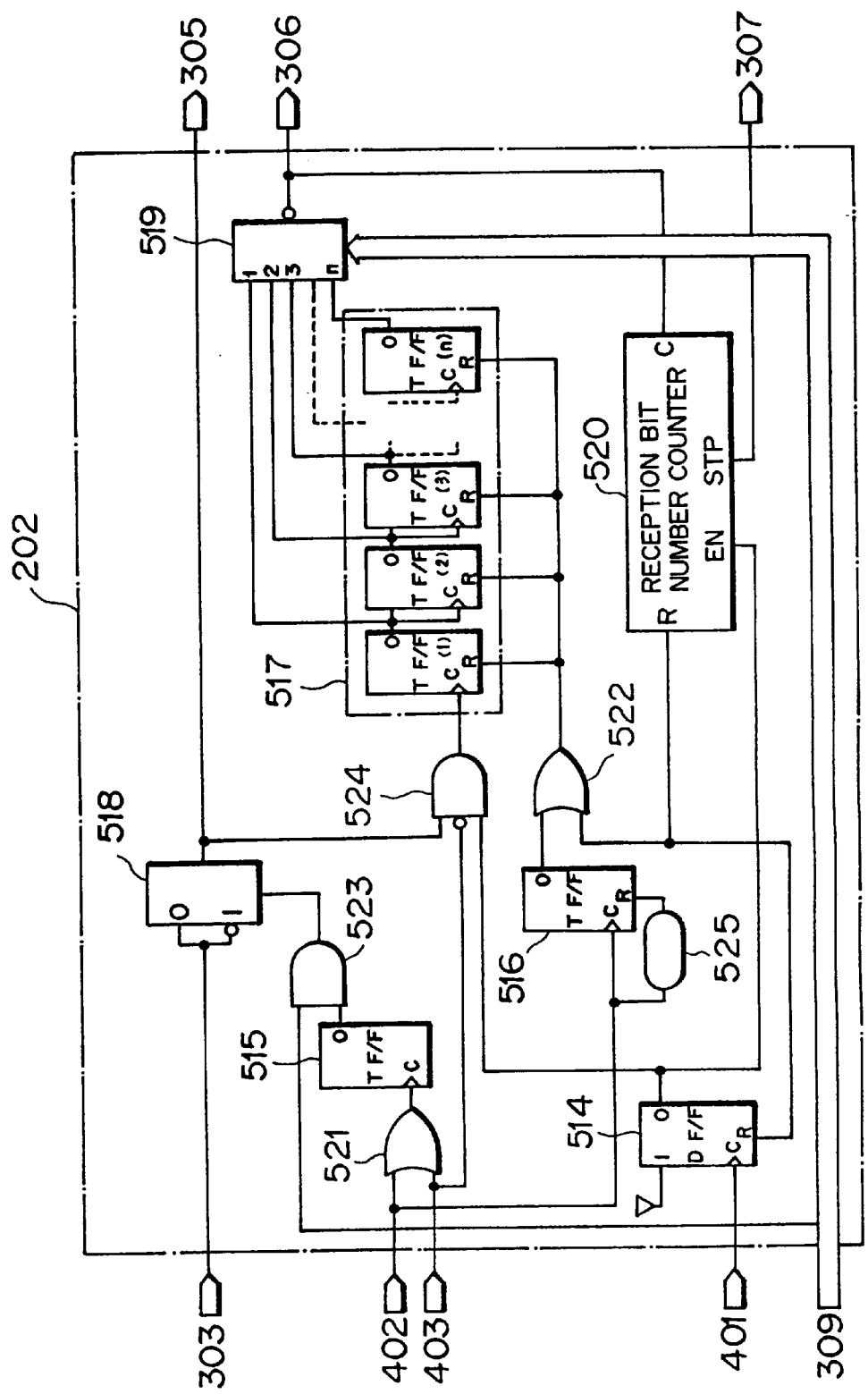
FIG. 7 is a schematic circuit diagram showing details of a clock frequency divider/corrector circuit 202 used in the first embodiment.

Next, a preferred embodiment of the present invention will be explained with reference to the accompanying drawings below. FIG. 5 is a block diagram showing a configuration of a first embodiment of the present invention, FIG. 6 is a schematic circuit diagram showing a concrete configuration of a phase detecting/collating circuit 201, and FIG. 7 is a schematic circuit diagram showing a concrete configuration of a clock frequency divider/corrector circuit 202. In these drawings, N represents an integer showing a divided frequency ratio of a clock and n represents an integer showing the upper limit of the divided frequency ratio determined by a system configuration.

A data transmission device of the present embodiment comprises a data transmission circuit 101, an external interface circuit 102, a transmission clock frequency divider circuit 103, the phase detecting/collating circuit 201, the clock frequency divider/corrector circuit 202, and a delay circuit 203.

The data transmission circuit 101 includes a data receiving function for storing data which is input to a reception serial data 302 on the rising edge of a reception data shift clock 306, and a data transmitting function for outputting the data to a transmission serial data 301 on the falling edge of a transmission data shift clock 304. The data transmission circuit 101 outputs a divided frequency ratio selection signal 309 (N=1 to n) based on transfer rate (½ of a basic clock 303) previously determined between this data transmission device and a target of the transmission external to the data transmission device.

The external interface circuit 102 includes an interface function with external to the data transmission device. The transmission clock frequency divider circuit 103 and the reception clock frequency divider/corrector circuit 202 divide the basic clock 303 based on the divided frequency selection signal 309 which is input, and outputs the transmission data shift clock 304 and the reception data shift clock 306.

The phase detecting/collating circuit 201 collates the reception serial data 302 input from outside through the external interface circuit 102, the reception data shift clock 306 output from the clock frequency divider/corrector circuit 202, and a phase collating clock 308 which is obtained by delaying the reception data shift clock 306 by ¼ period of the reception data shift clock 306 by means of the delay circuit 203. If a phase difference having a possibility to generate a reception error in the data transmission circuit 101 is detected during the phase collation by the phase detecting/collating circuit 201, the phase detecting/collating circuit 201 outputs a clock shortening timing signal 402 or a clock elongating timing signal 403.

The reception clock frequency divider/corrector circuit 202 corrects to shorten or elongate the reception data shift clock 306 based on the input clock shortening timing signal 402 or the clock elongating timing signal 403. According to this effect, the reception operation in the data transmission circuit 101 is executed always normally. That is, the clock frequency divider/corrector circuit 202 includes a function to correct for shortening the reception data shift clock 306 by inputting a pulse to the clock shortening timing signal 402, and a function to correct for elongating the reception data shift clock 306 by inputting a pulse to the clock elongating timing signal 403. The transmission data shift clock 304 is input to a terminal of the data transmission circuit 101, and the reception data shift clock 306 is also input to another terminal of the data transmission circuit 101.

The delay circuit 203 is a delay circuit to recognize the transmission rate based on the divided frequency ratio selection signal 309 and to delay the reception data shift clock 306 by ¼ rate of the transmission rate, and outputs the delayed clock as the phase collating clock 308.

As shown in FIG. 6, the phase detecting/collating circuit 201 determines a data transition expecting section of the reception serial data 302 by a combination of logic levels of the reception data shift clock 306 and the phase collating clock 308, and collates the data transition expecting section with the data transition point of the reception serial data 302. In the present embodiment, a period during which the logic levels of both the reception data shift clock 306 and the phase collating clock 308 are 1 is determined as the data transition expecting section. The phase detecting/collating circuit 201 is provided therein with a D-type flip-flop 501, a (n−2)-stage connection D-type flip-flop 502, a T-type flip-flop 503, a T-type flip-flop 504, a T-type flip-flop 505, an n-input selector 506, an XNOR gate 507, an NOR gate 509, an AND gate 510, an AND gate 511, an NAND gate 512 and a delay circuit 513. The D-type flip-flop 501 and the XNOR gate 507 are circuits for outputting one shot pulse of negative logic when the transition of the reception serial data 302 is generated. The delay circuit 513 is a delay circuit provided for securing the width of this pulse. The NOR gate 508 is a gate for inversely outputting the output from the XNOR gate 507. The T-type flip-flop 503 is a holding circuit of a reception starting timing signal 401 for outputting the logic 1 with the timing at which the output of the XNOR gate 507 becomes the logic 1. The reception data shift clock 306 has been input to the T-type flip-flop 503 as an initialization signal, and after the receiving operation is started, the output of the T-type flip-flop 503 becomes the logic 0 with the timing at which the reception data shift clock 306 becomes the logic 0. The AND gate 510 is a gate for outputting the logic 1 when the reception data shift clock 306 is the logic 1 and the phase collating clock 308 is the logic 0, i.e., when the negative logic pulse of the data transition detection is output from the XNOR gate 507 before the data transition expecting section. The T-type flip-flop 504 is a holding circuit of the clock shortening timing signal 402 for outputting the logic 1 with the timing at which the output of the AND gate 510 becomes the logic 1. The AND gate 511 is a gate for outputting the logic 1 when the reception data shift clock 306 is the logic 0 and the phase collating clock 308 is the logic 0, i.e., when the negative logic pulse of the data transition detection is output from the XNOR gate 507 after the data transition expecting section. The T-type flip-flop 505 is a holding circuit of the clock elongating timing signal 403 for outputting the logic 1 with the timing at which the output of the AND gate 511 becomes the logic 1. The NOR gate 509 is a gate for outputting the logic 1 during a period when both the reception data shift clock 306 and the phase collating clock 308 are the logic 0. The (n−2)-stage connection D-type flip-flop 502 is a shift register for shifting the output of the NOR gate 509 to an input data and shifting the data transition detecting clock 305 to a shift clock. The n-input selector 506 is a selector for selecting the output of the NOR gate 509 and the output of the (n−2)-stage connection D-type flip-flop 502 based on a divided frequency ratio selection signal 309 which is input to the n-input selector 506. The output of the n-input selector 506 is input to the HAND gate 512. NAND gate 512 is a gate for generating a pulse of negative logic from the logic 1 of the input selector 506 and the logic 0 of the data transition detecting clock 305, and for outputting the initialization signals of the T-type flip-flop 504 and the T-type flip-flop 505.

Next, with reference to FIG. 7, the clock frequency divider/corrector circuit 202 will be explained in detail. The clock frequency divider/corrector circuit 202 is provided therein with a D-type flip-flop 514, a T-type flip-flop 515, a T-type flip-flop 516, an n-state connection T-type flip-flop 517, a 2-input selector 518, an n-input selector 519, a reception bit number counter 520, an OR gate 521, an OR gate 522, an AND gate 523, an AND gate 524 and a delay circuit 525. The D-type flip-flop 514 is a holding circuit for outputting the logic 1 when the logic 1 is input to the reception starting timing signal 401, and the output of the D-type flip-flop 514 functions as a operation permission signal of the entire clock frequency divider/corrector circuit 202. An internal reset pulse signal of the clock frequency divider/corrector circuit 202 which is output from the reception bit number counter 520 as the initialization signal has been input to the D-type flip-flop 514. The output of the D-type flip-flop 514 becomes the logic 0 by the reset pulse signal which is output by the reception bit number counter 520 when the transmission is completed, whereby the operation of the entire clock frequency divider/corrector circuit 202 is stopped. Each of the OR gate 521, the T-type flip-flop 515 and the AND gate 523 is a circuit for inverting the output of the AND gate 523 when N=1, i.e., divide by-2 is selected in the divided frequency ratio selection signal 309, and when the logic 1 is input to the clock shortening timing signal 402 or the clock elongating timing signal 403. The 2-input selector 518 is a selector for selecting the basic clock 303 and the inverted signals of the basic clock 303, and the select signal is an output of the AND gate 523. The AND gate 524 is a gate for outputting the data transition detection clock 305 to the n-stage connection T-type flip-flop 517 as a count clock during a period when the output of the D-type flip-flop 514 is the logic 1. An inverted signal of the clock elongating timing signal 403 which has been input to the AND gate 524 functions as a mask signal of the clock output from the AND gate 524. The n-stage connection T-type flip-flop 517 is a circuit having a divider function of the count clock, and the n-input selector 519 is a circuit for selecting an output of each of the flip-flops of the n-stage connection T-type flip-flop 517 based on the divided frequency ratio selection signal 309 which is input to the n-input selector 519, and for outputting the reception data shift clock 306. The reception bit number counter 520 is permitted to operate if the D-type flip-flop 514 output the logic 1, and detects the completion of the transmission by counting the number of clocks of the reception data shift clock 306, and outputs the reception stopping signal 307 and an internal reset signal of the clock frequency divider/corrector circuit 202. Each of the T-type flip-flop 516 and the delay circuit 525 is a circuit for outputting one shot pulse when the logic 1 is input to the clock shortening timing signal 402. The OR gate 522 is a gate to which the output of the T-type flip-flop 516 and the internal reset pulse signal output from the reception bit number counter 520 are input, and the output from the OR gate 522 functions as an initialization signal of each of the flip-flops of the n-stage connection T-type flip-flop 517.

Next, the operation of the data transmission device of the present invention having the above-described configuration will be explained with reference to FIGS. 5 to 7 as well as timing charges of FIGS. 8 to 11. In the following description, each of the reception data shift clocks 306 is ½ of the basic clock 303. That is, the divided frequency ratio selection signal 309 is effective when N=1, and a path when N=1 is selected by the n-input selectors 506 and 519. The logic 1 is input to (N=1) signal input of the divided frequency ratio selection signal 309 in the AND gate 523, and the selection of the 2-input selector 518 by the output of the T-type flip-flop 515 becomes effective.

Figure 8:
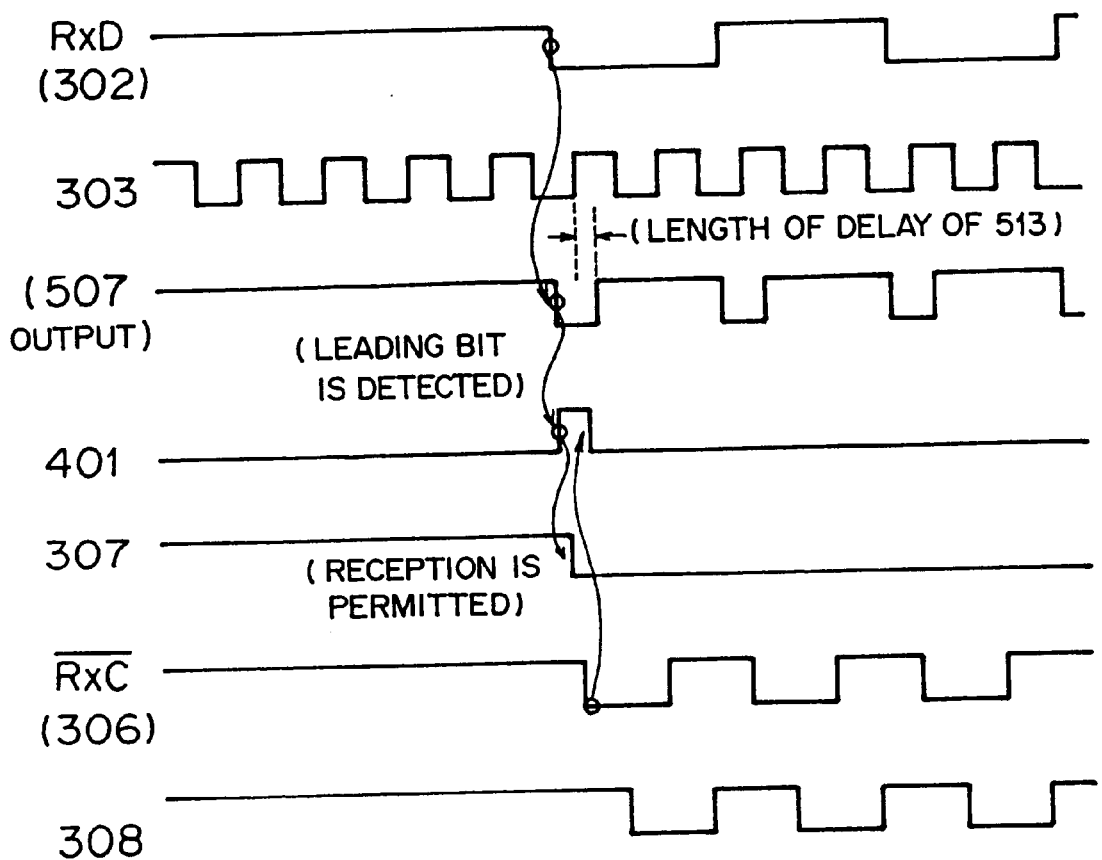
FIG. 8 is a timing chart of the embodiment of the invention.

FIG. 8 shows the operation timing when the receiving operation is started. The XNOR gate 507 in the phase detecting/collating circuit 201 compares the reception serial data 302 and the logic level of the reception serial data 302 in its previous state that the D-type flip-flop 501 held in synchronous with the rising edge of the data transition detection clock 305, and when there is a difference, the XNOR gate 507 outputs a transition detection pulse of the logic 0. The NOR gate 508 receives this transition detection pulse and outputs the logic 1 and as a result, the reception starting timing signal 401 is output. The reception starting timing signal 401 is input to the delay circuit 513 of the clock frequency divider/corrector circuit 202, the delay circuit 513 outputs the logic 1, and the inside of the clock frequency divider/corrector circuit 202 is brought into an activate state. Since the clock frequency divider/corrector circuit 202 is brought into the activate state, the AND gate 524 starts outputting the count clock to the n-stage connection T-type flip-flop 517, and the reception data shift clock 306 is output, whereby the data transmission circuit 101 starts the receiving operation.

The reception bit number counter 520 starts counting the number of reception bits, and outputs the logic 0 to the reception stopping signal 307. In the phase detecting/collating circuit 201, if the reception data shift clock 306 is output, the reception starting timing signal 401 is initialized, and if the reception stopping signal 307 becomes the logic 0, the output of the NOR gate 508 is fixed to the logic 0, and the leading bit detection function is stopped.

Figure 9:
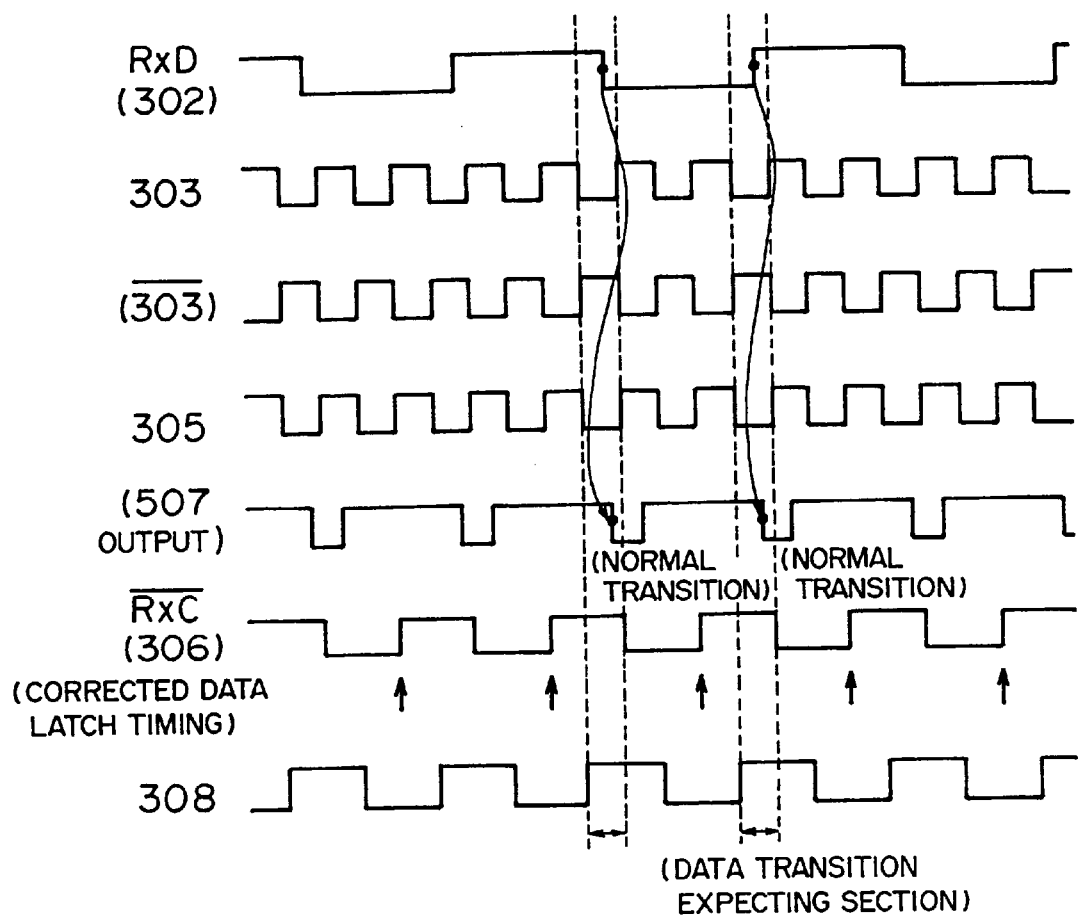
FIG. 9 is a timing chart of the embodiment of the invention.

FIG. 9 shows a receiving operation timing when the correction of the reception data shift clock is not generated. As shown in FIG. 9, when the data transition is generated in the data transition expecting section, the transition detection pulse which is the output of the XNOR gate 507 in the phase detecting/collating circuit 201 is generated if each of the reception data shift clock 306 and the phase collating clock 308 is the logic 1. That is in the AND gate 510 in the phase detecting/collating circuit 201, it is judged that the reception data shift clock 306 is the logic 0 and the data transition is not generated in the section in which the phase collating clock 308 is the logic 1, and in the AND gate 511, it is judged that the data transition is not generated in a section where the reception data shift clock 306 is the logic 1 and the phase collating clock 308 is the logic 0. Thus, the logic 1 is not output in any case, and the clock shortening timing signal 402 and the clock elongating timing signal 403 are not generated. Therefore, the correction of the reception data shift clock 306 is not carried out in the clock frequency divider/corrector circuit 202, and the clock frequency divider/corrector circuit 202 simply divide the basic clock 303 to output the reception data shift clock 306, and supplies the same to the data transmission circuit 101.

Figure 10:
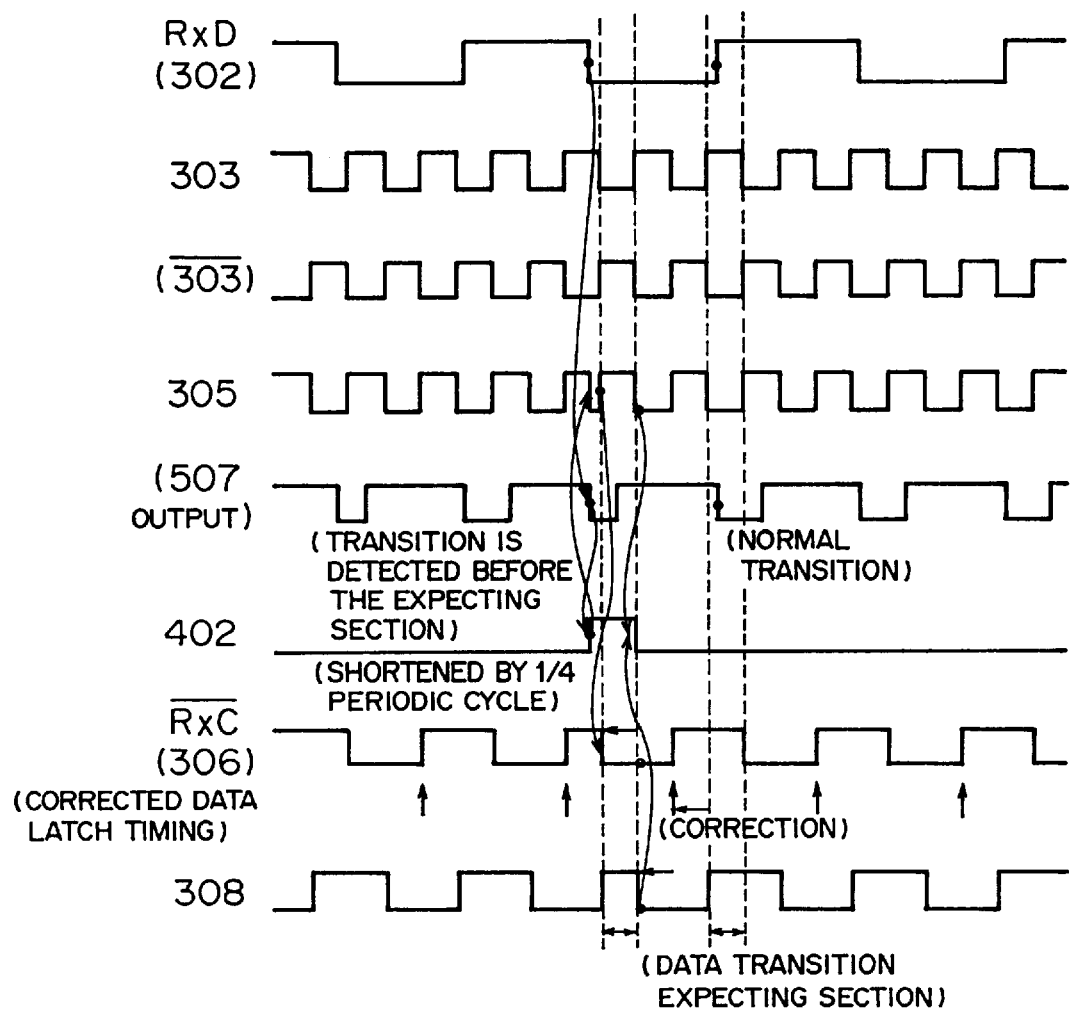
FIG. 10 is a timing chart of the embodiment of the invention.

FIG. 10 shows an operation timing when the correction for shortening the reception data shift clock is generated. As shown in FIG. 10, in a period when the reception data shift clock 306 is the logic 1 and the phase collating clock 308 is the logic 0, if the transmission detecting pulse which is the output of the XNOR gate 507 in the clock frequency divider/corrector circuit 202 is generated, the AND gate 510 in the phase detecting/collating circuit 201 detects this as a transition before the data transition expecting section, and output the logic 1. By this output, an output of the T-type flip-flop 504 in phase detecting/collating circuit 201 becomes the logic 1, and the clock shortening timing signal 402 is output. Next, the clock shortening timing signal 402 is input to the T-type flip-flop 515 through the OR gate 521 in the clock frequency divider/corrector circuit 202, and the output of the T-type flip-flop 515 becomes the logic 1. The output of the T-type flip-flop 515 is input to the 2-input selector 518 through the AND gate 523, and the count clock of the n-stage connection T-type flip-flop 517 selected by the 2-input selector 518 becomes the inverted clock of the basic clock 303. With this, the count up of the n-stage connection T-type flip-flop 517 is generated early by ½ of the basic clock 303, i.e., by ¼ of one cyclic period of the reception data shift clock 306 and as a result, the reception data shift clock 306 is corrected to be shortened. By the correction for shortening the reception data shift clock 306, the next data transition point of the reception serial data 302 revolves to one section where the logic of both the reception data shift clock 306 and the phase collating clock 308 is 1, i.e., to the data transition expecting section. The clock shortening timing signal 402 is cleared to the logic 0 by an initialization signal generated from the NAND gate 512 in the phase detecting/collating circuit 201 during a period when all of the data transition detection clock 305, the reception data shift clock 306 and the phase collating clock 308 are logic 0.

Figure 11:
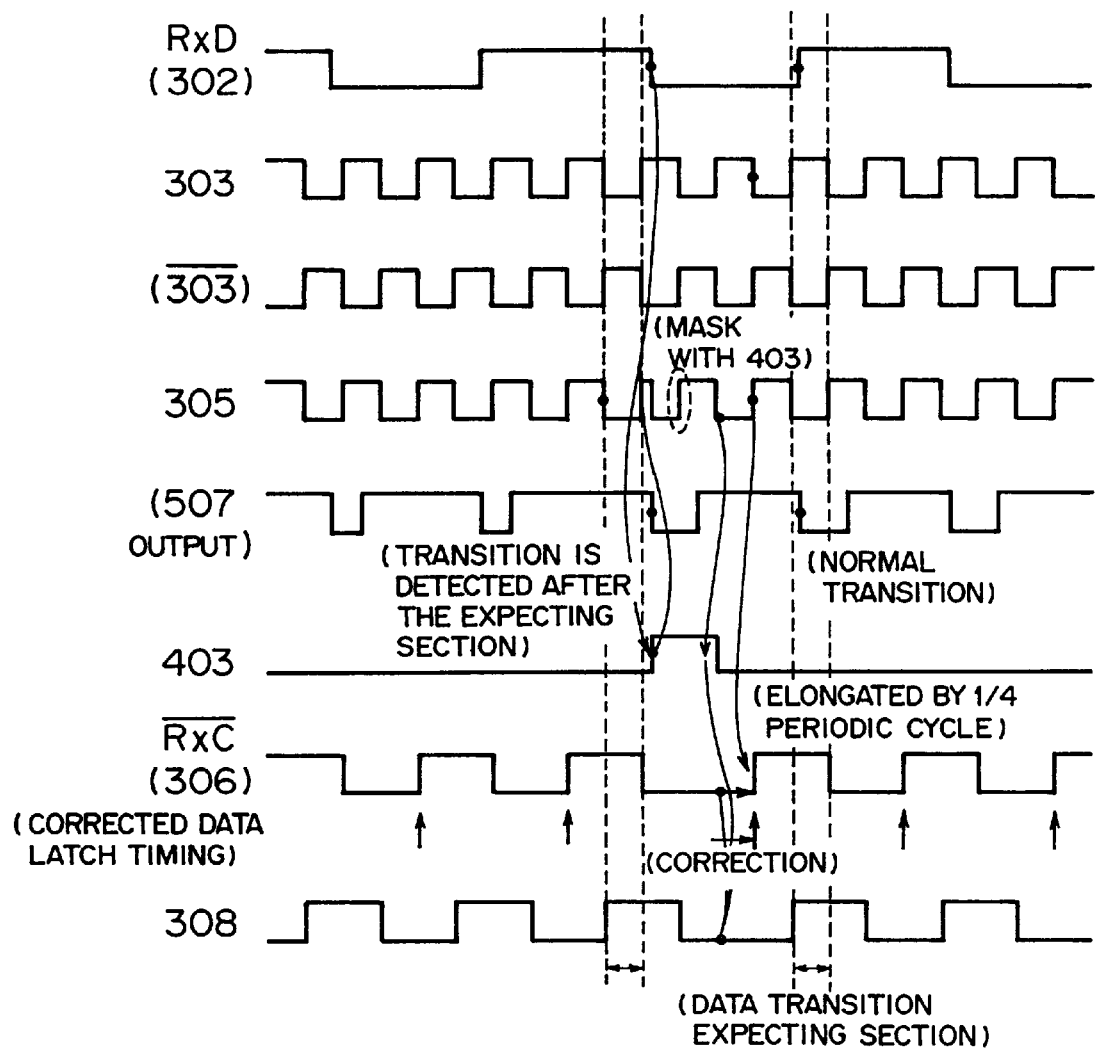
FIG. 11 is a timing chart of the embodiment of the invention.

FIG. 11 shows an operation timing when the correction for elongating the reception data clock is generated. As shown in FIG. 11, when a transition detection pulse which is the output of the XNOR gate 507 in the clock frequency divider/corrector circuit 202 is generated during a period when the reception data shift clock 306 is the logic 0 and the phase collating clock 308 is the logic 1, the AND gate 511 in the phase detecting/collating circuit 201 detects this as a transition after the data transition expecting section, and outputs the logic 1. With this output, an output of the T-type flip-flop 505 in the phase detecting/collating circuit 201 becomes the logic 1, and the clock elongating timing signal 403 is output. Next, the clock elongating timing signal 403 is input to the T-type flip-flop 515 through the OR gate 521 in the clock frequency divider/corrector circuit 202, and an output of the T-type flip-flop 515 becomes the logic 1. The output of the T-type flip-flop 515 is input to the 2-input selector 518 through the AND gate 523, and the count clock of the n-stage connection T-type flip-flop 517 selected by the 2-input selector 518 becomes the inverted clock of the basic clock 303. The clock elongating timing signal 403 is inverted and input to the AND gate 524, and masks the output of the count clock output during a section where the clock elongating timing signal 403 is the logic 1. With this, the count up of the n-stage connection T-type flip-flop 517 is suspended by ½ of the basic clock 303, i.e., by ¼ of one cyclic period of the reception data shift clock 306 and as a result, the reception data shift clock 306 is corrected to be elongated. By the correction for elongating the reception data shift clock 306, the next data transition point of the reception serial data 302 revolves to one section where the logic of both the reception data shift clock 306 and the phase collating clock 308 is 1, i.e., to the data transition expecting section. The clock elongating timing signal 403 is cleared to the logic 0 by an initialization signal generated from the NAND gate 512 in the phase detecting/collating circuit 201 during a period when all of the data transition detection clock 305, the reception data shift clock 306 and the phase collating clock 308 are logic 0.

When ¼ (N=2 to n) or more of the basic clock 303 is selected as a rate of the reception data shift clock 306, the logic 0 is input to the (N=1) signal input of the divided frequency ratio selection signal in the AND gate 523, and the selection of the 2-input selector 518 by the output of the T-type flip-flop 515 is invalidated. When ⅛ (N=3 to n) or more of the basic clock 303 is selected as the rate of the reception data shift clock 306, the NOR gate 509 in the phase detecting/collating circuit 201 detects the period when both the reception data shift clock 306 and the phase collating clock 308 are logic 0, and counts this period by the (n−2)-stage connection D-type flip-flop 502 to delay the timing at which the n-input selector 506 outputs the logic 1, whereby the pulse width of each of the clock shortening timing signal 402 and the clock elongating timing signal 403 is elongated. In the present embodiment, this function can realize the same correction timing as those in FIGS. 10 and 11 independently from the rate of the reception data shift clock 306.

Figure 12:
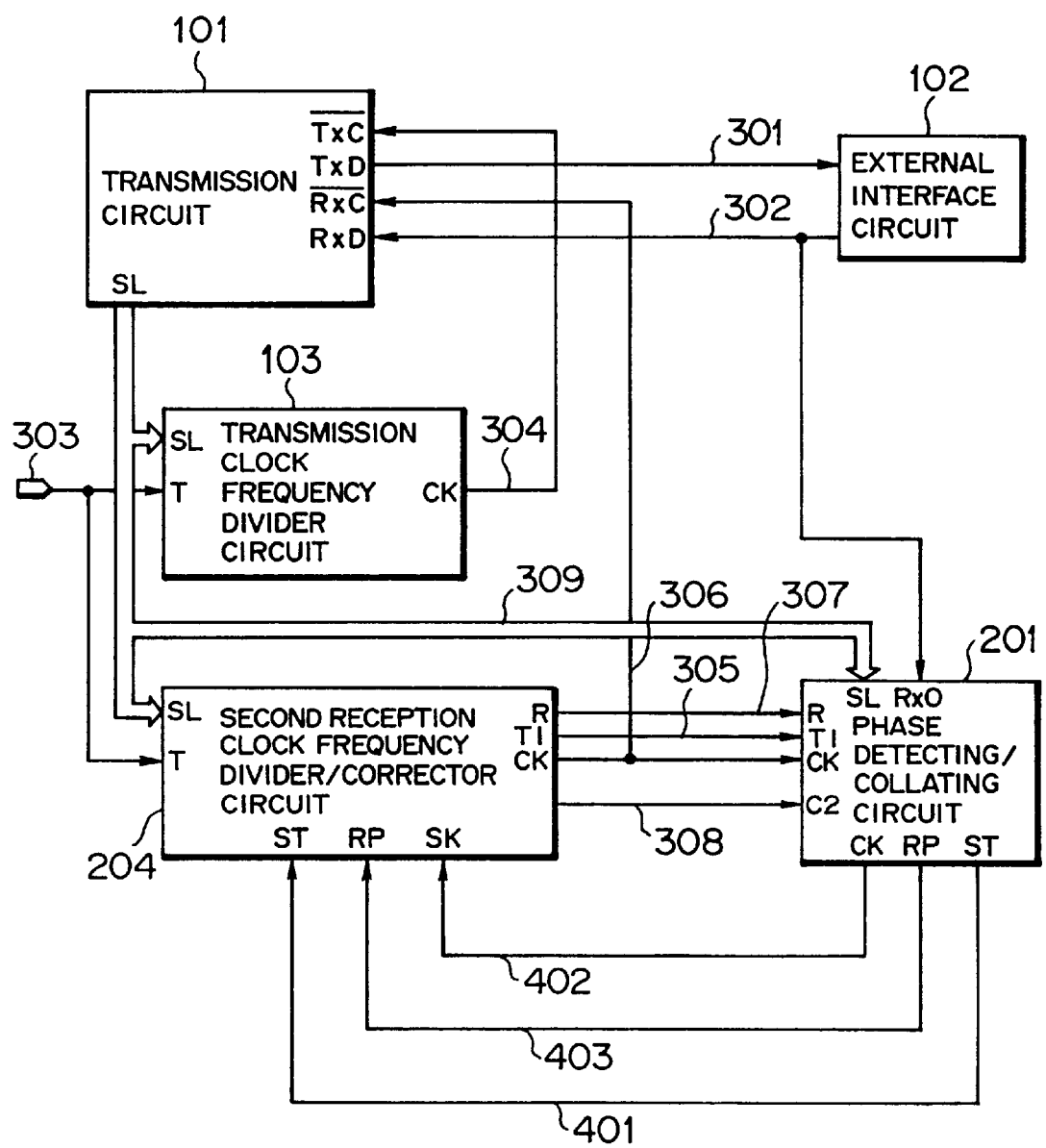
FIG. 12 is a block diagram showing a data transmission device according to a second embodiment of the invention.
Figure 13:
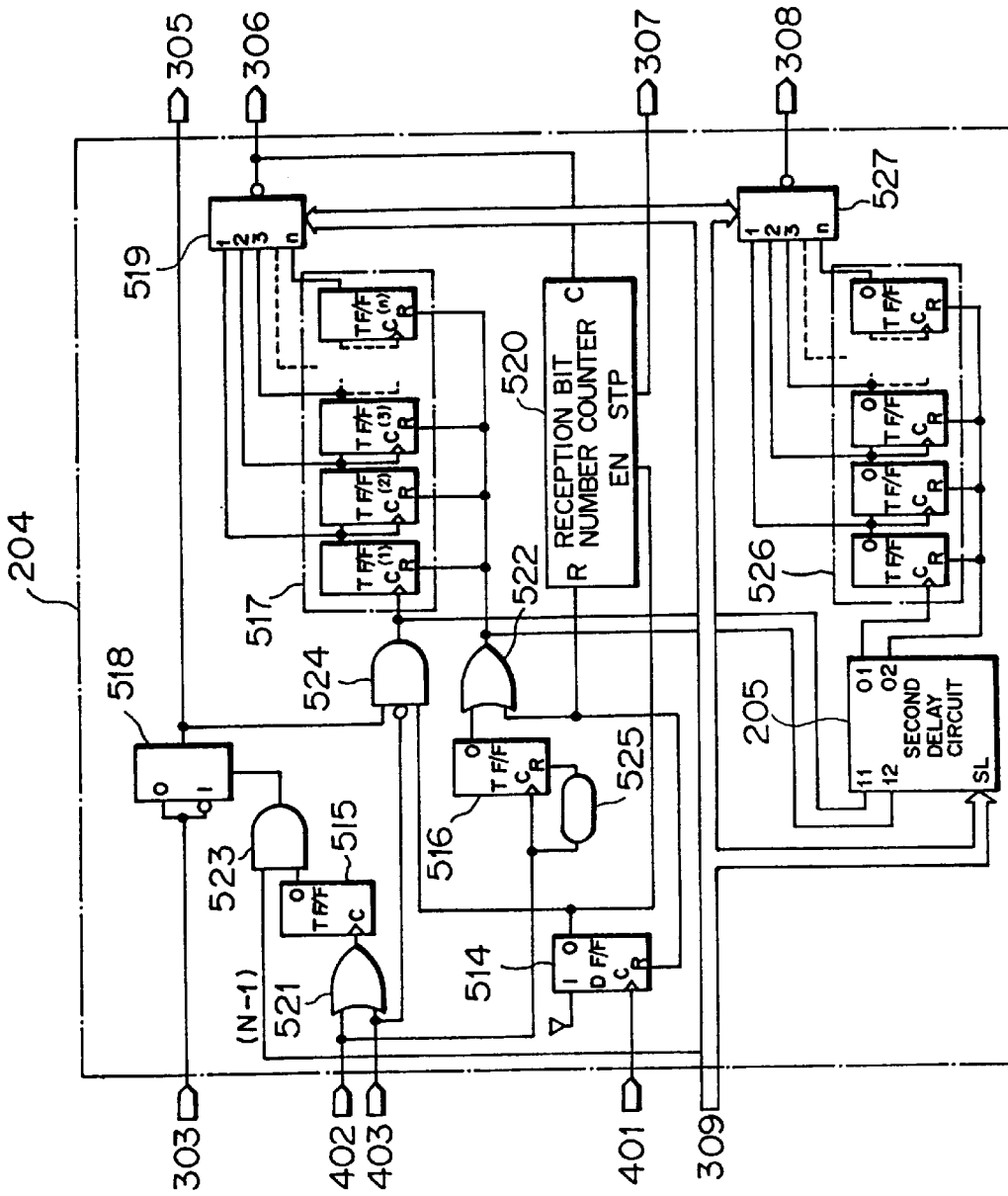
FIG. 13 is a schematic circuit diagram showing details of a second clock frequency divider/corrector circuit 204 used in the second embodiment.

Next, a second embodiment of the invention will be explained with reference to a block diagram in FIG. 12 and a schematic circuit diagram of a reception clock frequency divider/corrector circuit 204 in FIG. 13. In a data transmission device of the second embodiment, the reception clock frequency divider/corrector circuit is replaced by the second reception clock frequency divider/corrector circuit 204. As shown in FIG. 13, in the second reception clock frequency divider/corrector circuit 204, the n-stage connection T-type flip-flop 517, an n-stage connection T-type flip-flop 526, the n-input selector 519 and an n-input selector 527 are disposed in parallel to one another, and a second delay circuit 205 is incorporated in the second reception clock frequency divider/corrector circuit 204. The second delay circuit 205 is a dual system delay circuit which delays each of outputs of the OR gate 522 and the AND gate 524 by ¼ of the transmission rate, and supplies the outputs to the n-stage connection T-type flip-flop 526 for generating the phase collating clock 308.

A clock obtained by delaying the reception data shift clock 306 by ¼ of the transmission rate is always output to the phase collating clock 308 by the functions of the second delay circuit 205, the n-stage connection T-type flip-flop 526 and the n-input selector 527. Like the clock output, the clock of the phase collating clock 308 is also corrected by delaying the reception data shift clock 306 by ¼ of the transmission rate and then by correcting the clock of the phase collating clock 308 in the same manner as that of the reception data shift clock 306. The reception data shift clock 306 and the phase collating clock 308 output from the second reception clock frequency divider/corrector circuit 204 are directly input to the phase detecting/collating circuit 201 without through other circuits. The phase collating function of the reception data transition point of the reception serial data 302 in the phase detecting/collating circuit 201, the reception data shift clock 306 and the phase collating clock 308 and the operation timing are the same as those of the first embodiment.

In the second embodiment, since no circuit exists on a path between the reception data shift clock 306 and the phase collating clock 308, a difference between the transmission delays of the two clocks to be sent to the phase detecting/collating circuit 201 becomes smaller. As a result, as compared with the first embodiment, there are effects that the data transition expecting section can be secured more stably, and the precision of the phase collation can be enhanced.

As explained above, according to the data transmission device of the present invention, when the phase of the reception data shift clock and the transition point of the reception data are collated, the data transition expecting section is determined by the reception data shift clock and by the logic level of the phase collating clock generated from the reception data shift clock, and this section and the reception transition point are collated. Therefore, it is possible to correct the reception data shift clock independently from the transmission rate of the reception data shift clock, whereby a normal data receiving operation can be realized, and normal data correction and speed-up of the data transmission can be realized.

What is claimed is:

1. A data transmission device comprising:
an external interface circuit for outputting, to said data transmission device, data which is input from external to said data transmission device as reception data, and for outputting transmission data which is input from said data transmission device to external to said data transmission device;
a transmission circuit for outputting said input transmission data in synchronous with a shift clock, and for storing said input reception data in synchronous with said shift clock;
a delay circuit for delaying input reception shift clock, and for outputting the same as a phase collating clock;
a phase detecting/collating circuit for determining a transition expecting section of said reception data based on a logic level of said input reception data shift clock and said phase collating clock to collate a phase of said reception data shift clock and a transition point of said input reception data, said phase detecting/collating circuit detecting that it is necessary to shorten said reception data shift clock and outputting a clock shortening timing signal when said reception data transition point is earlier than said phase of said reception data shift clock, and said phase detecting/collating circuit detecting that it is necessary to elongate said reception data shift clock and outputting a clock elongating timing signal when said reception data transition point is slower than said phase of said reception data shift clock;

a reception clock frequency divider/corrector circuit for dividing a basic clock input from external to said data transmission device to output said reception data shift clock, said reception clock frequency divider/corrector circuit correcting such as to shorten said reception data shift clock and outputting the same when a clock shortening timing signal is input, and said reception clock frequency divider/corrector circuit correcting such as to elongate said reception data shift clock and outputting the same when a clock elongating timing signal is input; and a transmission clock frequency divider circuit for dividing said basic clock which is input to said data transmission device and for outputting a transmission data shift clock, wherein a clock is corrected independently from data transmission rate.

2. A data transmission device according to claim 1, wherein said phase detecting/collating circuit collates a phase of a reception serial data input from outside through said external interface circuit, a phase of said reception data shift clock output from said clock frequency divider/corrector circuit, and a phase of a phase collating clock obtained by delaying said reception data shift clock by ¼ periodic cycle of said reception data shift clock by means of said delay circuit, and if a difference in phase capable of generating a reception error in said data transmission circuit is detected, said clock shortening timing signal or said clock elongating timing signal is output.

3. A data transmission device according to claim 1, wherein said reception clock frequency divider/corrector circuit corrects to shorten said reception data shift clock by inputting a pulse to said clock shortening timing signal, and corrects to elongate said reception data shift clock by inputting a pulse to said clock elongating timing signal.

4. A data transmission device according to claim 1, wherein said delay circuit recognizes a transmission rate based on a divided frequency ratio selection signal which is input to said delay circuit, delays said reception data shift clock by ¼ rate of said transmission rate, and outputs the delayed clock as a phase collating clock.

5. A data transmission device according to claim 1, wherein said reception clock frequency divider/corrector circuit comprises:

an n-stage connection T-type flip-flop;

another n-stage connection T-type flip-flop which is in parallel to said former n-stage connection T-type flip-flop;

an n-input selector connected to said n-stage connection T-type flip-flop;

another n-input selector connected to said n-stage connection T-type flip-flop; and a dual data transmission device delay circuit for delaying outputs of an OR gate and an AND gate by ¼ rate of a transmission rate, and supplying the delayed outputs to said n-stage connection T-type flip-flop for generating a phase collating clock.

* * * * *